US005538630A

United States Patent [19]

Burns

[11] Patent Number: 5,538,630

[45] Date of Patent: Jul. 23, 1996

[54] WASTE WATER TREATMENT APPARATUS EMPLOYING A ROTATING PERFORATED CYLINDER AND BAFFLES

[76] Inventor: James L. Burns, P.O. Box 2764, Crestline, Calif. 92325

[21] Appl. No.: 367,037

[22] Filed: Dec. 29, 1994

Related U.S. Application Data

[63] Continuation-in-part of Ser. No. 183,187, Jan. 14, 1994, abandoned, which is a continuation-in-part of Ser. No. 861,146, Mar. 31, 1992, abandoned.

[51] Int. Cl.$^6$ ............................ B01D 15/00; B01D 33/06

[52] U.S. Cl. .................. 210/198.1; 210/359; 210/360.1; 210/360.2; 210/380.1; 210/383; 210/407; 210/472; 210/402; 366/234; 261/83

[58] Field of Search ............................ 366/234; 210/359, 210/198.1, 360.1, 360.2, 380.1, 380.2, 383, 407, 402, 472; 68/3 R, 12.01, 12.13, 23 R; 261/83

[56] References Cited

U.S. PATENT DOCUMENTS

| | | |
|---|---|---|
| 1,356,250 | 10/1920 | Williamson . |
| 1,593,622 | 7/1926 | Ehrich . |
| 3,256,994 | 6/1966 | Koelsch . |
| 3,260,369 | 7/1966 | Gruenewaelder . |
| 5,125,966 | 6/1992 | Siefert et al. . |

*Primary Examiner*—Robert A. Dawson
*Assistant Examiner*—Robert James Popovics
*Attorney, Agent, or Firm*—Sheldon & Mak

[57] ABSTRACT

Disclosed is an apparatus for refining waste water. The apparatus includes a housing having an inlet for receiving the waste water and an outlet for delivery of refined water; a cylindrical drum member rotatably mounted in the housing, the drum member having a radial thickness t between inside and outside surfaces thereof, a multiplicity of circularly cylindrical passages being formed in the drum member, the passages having a passage diameter d of approximately 0.75 inch, at least a portion of each passage terminating with the outside surface at a corner radius r of not more than approximately 0.002 inch; a vent for admitting air into the housing; and a drive for rotating the drum to a peripheral speed of at least 1000 feet per second, whereby molecules of the waste water are physically separated from the contaminants for forming the refined water, the refined water flowing from the outlet. Also disclosed is a method for refining a liquid, including the steps of providing a housing having an inlet and an outlet for the liquid, a cylindrical drum member rotatably mounted in the housing and having a multiplicity of passages formed between inside and outside surfaces of the drum member; rotating the drum to a peripheral speed of at least 1000 feet per second; feeding the liquid into the inlet and out of the outlet of the housing; and inducing a recirculating flow of the liquid through the passages and in contact with the drum for separating impurities from the liquid.

8 Claims, 2 Drawing Sheets

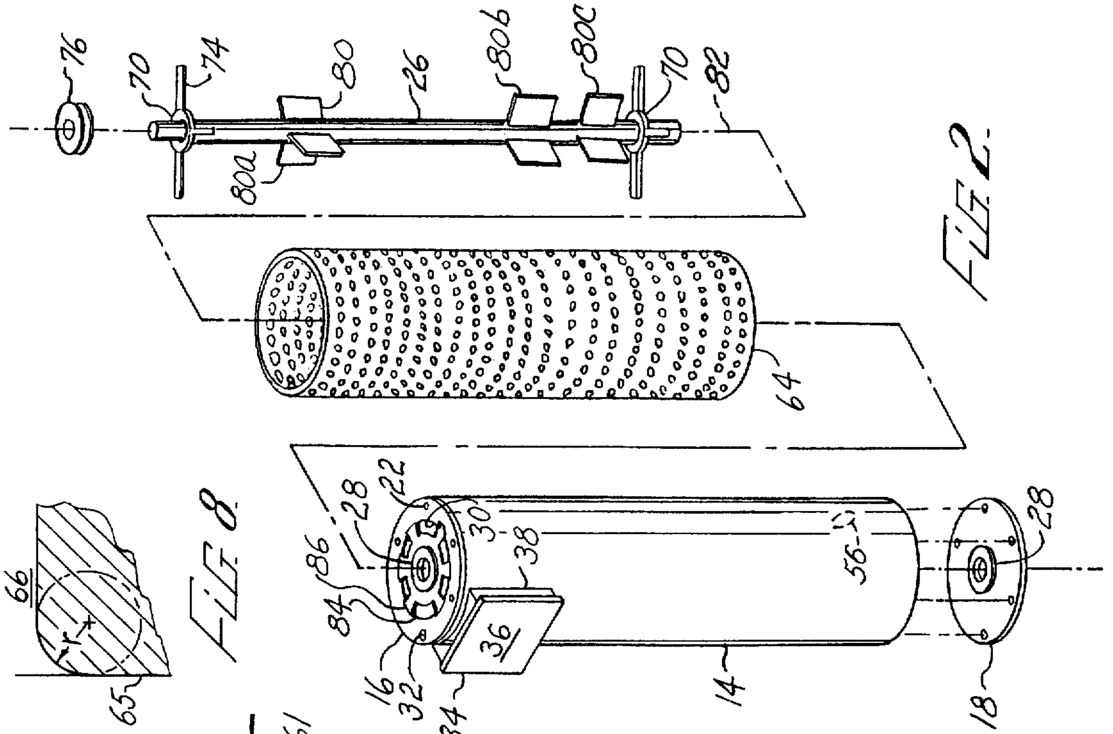
FIG. 2
FIG. 8
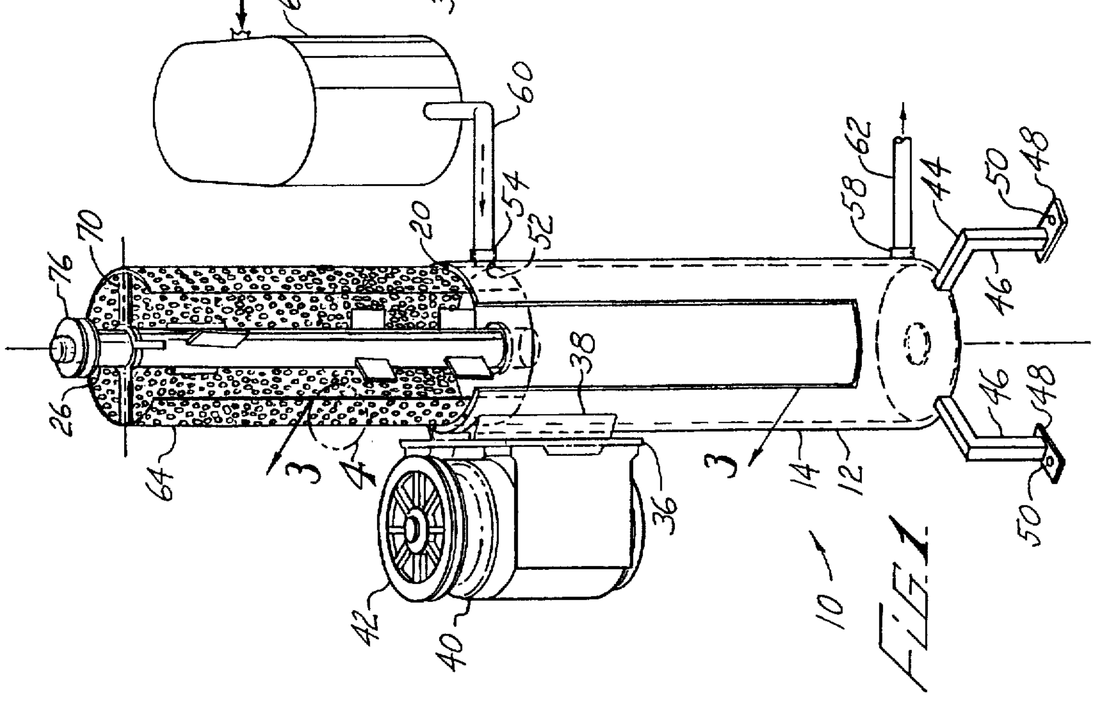
FIG. 1

WASTE WATER TREATMENT APPARATUS EMPLOYING A ROTATING PERFORATED CYLINDER AND BAFFLES

RELATED APPLICATIONS

This application is a continuation-in-part application Ser. No. 08/183,187, filed on Jan. 14, 1994, now abandoned, which is a continuation-in-part of application Ser. No. 07/861,146, filed on Mar. 31, 1992, now abandoned, which are incorporated herein by reference.

BACKGROUND

The present invention relates to removal of harmful solids, bacteria, hydrocarbons and the like from waste water such as industrial, manufacturing, municipal and agricultural waste water.

There are three basic methods and one advanced method typically used in the prior art for treating waste water prior to discharge into a sewage treatment plant or into rivers or streams, as follows:

A. Primary treatment.

Solids are mechanically separated from liquid wastes by settling and/or screening. Regardless of the ultimate disposal method it is desirable to remove, by screening, as much suspended solids as is feasible. Failure to screen out the solids results in pollutants being discharged into our rivers and streams or clogging filters if discharged to a sewage treatment plant. With this method of treatment the pH of the waste water is not altered. Thus, without further treatment, highly alkaline or acidic waste water would still enter sewage treatment plants, rivers and streams.

B. Secondary treatment.

Biological processes are used to reduce dispersed solids and the soluble organic content of liquid waste. Biological methods are most suitable for treating small volumes of waste water, usually in two stages. In the first stage, the screened water is admitted to a tank where air is continuously diffused into it. The wastes may be detained and aerated in batch or continuous flow operations. The efficiency of the process depends on building up a vigorous culture of suitable bacteria in the aeration/digestion tank. In the second stage of the process, the waste passes through sedimentation tanks where the flow is made as quiescent as possible in order to promote either flotation or settling of suspended solids. In certain situations, the suspended solids can be removed, rendering the water suitable for discharge to a sewage treatment plant or a body of water. In other cases, the water would be chemically treated to a relatively neutral pH prior to discharge in the sewage treatment plant or body of water. The cost for this method is extremely high and is generally used to treat only small volumes of waste water.

C. Spray and irrigation methods.

These methods consist of spreading the liquid waste over the surface of the ground by means of irrigation or a high pressure spray system. A rate of application is used which effects minimum damage to vegetative growth and avoids surface run-off and subsequent (or possible) erosion. These systems require large amounts of land and an actively growing crop to aid in absorption and to prevent soil erosion. Failure to properly screen waste could cause great difficulty in operation and unpleasant odors can be produced. There is a further possibility of ground water contamination unless great care is taken in selecting property for this use. During rainy seasons, the water tables typically rise, increasing the possibility of ground water contamination.

D. Advanced treatment.

More advanced methods of treating waste water, generally called tertiary treatment methods, take up where the first three methods leave off. One of these is the process known as coagulation-sedimentation. In this process, alum or lime is added to effluent as it comes from secondary treatment. The flow then passes through flocculation tanks where the chemicals cause the smaller particles to floc, or bunch together, in large masses which are removed by sedimentation. Another tertiary treatment method aims at getting rid of the dissolved refractory organic substances—stubborn organic matter which persists in water and resists normal biological treatment. By passing the effluent through a bed of activated carbon granules, more than 98 percent of the remaining dissolved organic matter can be removed by absorption. Another tertiary treatment is that of electrodialysis, by which salts from an effluent are removed from water by the action of an electric field. These methods are extremely costly and complex and would be unreasonable to use for any large quantities of water.

The U.S. Environmental Protection Agency (EPA) has issued standards for the quality of stream water and the strength of an effluent which can be legally discharged into it. The EPA is primarily a regulatory agency, with responsibilities for establishing and enforcing the environmental standards within the limits of its various statutory authorities. The agency shares many of its enforcement authorities within the states.

One of the major areas of EPA activity affecting food and processors is the Federal Water Pollution Control Act Amendment of 1972. The law created a program with three major elements: Uniform nation-wide standards, enforceable regulations, and a permanent program based on effluent limits and geared to specific chemicals, for improved physical and biological integrity of the nation's waters. Industry is required to meet the standards set up, regardless of the plant location and capacity of the stream for absorbing the wastes, without unreasonable damage. In some instances, this approach has resulted in unjust hardship to industry.

The waste water treatments of the prior art typically exhibit the following further disadvantages:

1. They are ineffective in separating out solids from waste water, with consequent contamination and clogging of filters in sewage treatment plants or direct contamination of water resources;
2. They are ineffective in eliminating microorganisms from the waste water;
3. They are expensive to provide in that they require large amounts of land and/or extensive structure.
4. They are expensive to operate in that they require large amounts of precipitation agents or other substances which must be discarded following use; and
4. They add harmful chemicals and other substances to the treated water.

Thus there is a need for a waste water treatment in which the solids are entirely removed prior to discharge, producing a neutral pH of the waste water prior to discharge; that does not require holding or settling tanks; that is a high speed process operating at whatever speed is required under various conditions; that does not require large amounts of land; that does not add additives or chemicals to the water at any time; that has low maintenance and operating costs; that eliminates land erosion; and that provides an environmentally safe process for preventing the polluting of underground water supplies, rivers and streams.

SUMMARY

The present invention meets this need by providing an apparatus for refining waste water. In one aspect of the invention, the apparatus includes a housing having an inlet for receiving the waste water and an outlet for delivery of refined water; a rotor rotatably mounted in the housing; a multiplicity of blade members on the rotor, each blade member having a substantially tangential first surface and a substantially radial second surface, the first and second surfaces intersecting at a convex corner radius of not more than approximately 0.002 inch; a drive for rotating the blade members to a peripheral speed of at least 1000 feet per second; and means for inducing a recirculating fluid flow within the housing and contacting the blade members, whereby molecules of the waste water are physically separated from the contaminants by the blade members for forming the refined water, the refined water flowing from the outlet.

The means for inducing the recirculating fluid flow can include the rotor being vertically oriented; and a plurality of baffle blades supported on the rotor for rotation radially inwardly from the blade members, an upper set of the baffle blades being oriented for producing a radial flow having a vertical component, and a lower set of the baffle blades being oriented for producing a radial flow having a vertical component directed oppositely of the vertical component of the upper set.

The apparatus can further include a drum member integrally forming the blade members, the drum member having at least one substantially cylindrical surface including the first surfaces of the blade members, a multiplicity of substantially radial passages extending through the drum member and including respective second surfaces of corresponding blade members. Some of the first surfaces of the blade members can be formed on an outside cylindrical surface of the drum member, others of the first surfaces being formed on an inside cylindrical surface of the drum member. The housing can be formed with an inside shell surface, the shell surface being radially spaced from at least some of the first surfaces of the blade members by a shell spacing S, the shell spacing S being from approximately 0.25 inch to approximately 2.0 inches. Preferably the spacing S is approximately 0.75 inch.

The second surfaces of at least some of the blade members can extend a radial distance t, the distance t being between approximately 0.25 inch and approximately 1.0 inch. The apparatus can include a drum member integrally forming the blade members, the first surfaces of the blade members being formed on substantially cylindrical inside and outside surfaces of the drum member, a multiplicity of substantially radial passages extending the radial distance t between the inside and outside surfaces and forming respective second surfaces of corresponding blade members. The radial distance t is preferably between approximately 0.5 inch and approximately 0.75 inch. The apparatus preferably includes a vent for admitting air into the housing.

In another aspect of the invention, an apparatus for refining a liquid includes a vertically oriented housing having the inlet for receiving the liquid and the outlet for delivery of the refined liquid; a vertically extending cylindrical drum member rotatably mounted in the housing, the drum member having a radial thickness t between inside and outside surfaces thereof, a multiplicity of radial passages being formed in the drum member, at least a portion of each passage terminating with the outside surface at a corner radius r of not more than approximately 0.002 inch; a drive for rotating the drum to a peripheral speed of at least 1000 feet per second; and a plurality of baffle blades supported within the drum member for rotation therewith, a upper set of the baffle blades being located near one end of the drum and oriented for producing an outward flow having a vertical component, and a lower set of the baffle blades being oriented for producing a radial flow having a vertical component directed oppositely of the vertical component of the upper set, whereby molecules of the waste water are physically separated from the contaminants for forming the refined water, the refined water flowing from the outlet.

Each of the passages can be approximately circularly cylindrical, having a passage diameter d. The passage diameter d can be from approximately 0.25 inch to approximately 2.0 inches. Preferably the passage diameter d is approximately 0.5 inch to approximately 1.0 inch. More preferably, the passage diameter d is approximately 0.75 inch. The passage diameter d can be from approximately 100% of the thickness t to approximately 150% of the thickness t.

In a further aspect of the invention, a method for refining a liquid includes the steps of:

(a) providing a housing having an inlet and an outlet for the liquid, a cylindrical drum member rotatably mounted in the housing and having a multiplicity of passages formed between inside and outside surfaces of the drum member;

(b) rotating the drum to a peripheral speed of at least 1000 feet per second;

(c) feeding the liquid into the inlet and out of the outlet of the housing; and (d) inducing a recirculating flow of the liquid through the passages and in contact with the drum for separating impurities from the liquid.

The step of inducing the recirculating flow can include the steps of:

(a) providing a plurality of baffle blades within the drum; and (b) moving the baffle blades for producing an outward flow near one end of the drum and having a flow component toward the opposite end of the drum, and for producing an outward flow near the opposite end of the drum and having a flow component toward the one end of the drum.

DRAWINGS

These and other features, aspects, and advantages of the present invention will become better understood with reference to the following description, appended claims, and accompanying drawings, where:

FIG. 1 is a front elevational partly exploded perspective view of a waste water treatment apparatus according to the present invention;

FIG. 2 is an exploded perspective view of the apparatus of FIG. 1;

FIG. 8 is a detail sectional view of the apparatus portion of FIG. 3 in region 8 thereof.

DESCRIPTION

Figure 4:
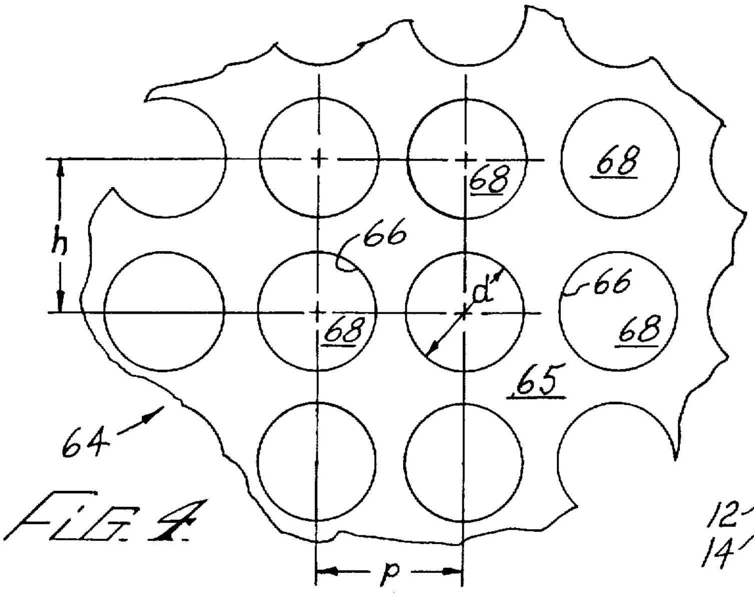
FIG. 4 is an elevational detail view of a drum portion of the apparatus of FIG. 1 within region 4 therein.

The present invention is directed to apparatus for treating waste water, that is particularly effective and efficient in conditioning water for reuse, for delivery to rivers and streams, and for delivery for further processing in existing sewage treatment systems. With reference to FIGS. 1–7 of the drawings, a treatment apparatus 10 includes a housing 12 for receiving waste water to be processed, the housing 12 having an outer shell 14, a top plate 16, and a bottom plate 18. In an exemplary configuration the outer shell 14 is constructed of carbon steel having a wall thickness of approximately 0.38 inch, stainless steel or other corrosion resistant metal. The outer shell 14 is formed as a round cylinder, approximately 12 inches in diameter and 52 inches in length. The top edge of the outer shell 14 has 6 holes 20, threaded to approximately 0.25 inch diameter, spaced about 2 inches apart, formed within the wall section. The top plate 16 is round, approximately 12 inches in diameter, formed of carbon steel having a wall thickness of approximately 0.50 inch, stainless steel or other corrosion resistant material. The top plate 16 is formed with 6 clearance holes 22, approximately 0.31 inch in diameter, for receiving respective 0.25 inch grade 5 bolts 24 that threadingly engage the holes 20 for mounting to the top section of the outer shell 14. The top plate 16 is machined back about 0.38 inch for allowing the top plate 16 to recess inside the outer shell 14. A drive shaft 26 is concentrically rotatably mounted to the top plate 16 by a high speed precision anti-friction bearing 28 having an inside diameter of approximately 2 inches, the drive shaft 26 extending through the top plate 16 from within the housing 12 for drive thereof as described below. The top plate 16 also has six vent openings 30 formed therein for admitting air into the housing 12 as described below.

The bottom plate 18 of the housing 12 is approximately 12 inches in diameter and formed of carbon steel having a wall thickness of approximately 0.50 inch, stainless steel or other corrosion resistant material, bolted to the bottom section of the outer shell 14 with six counterparts of the bolts 24 as described above in connection with the top plate 16. Also, a bottom extremity of the drive shaft 26 is concentrically rotatably mounted to the bottom plate 18 using another high speed precision anti-friction bearing 28.

On the outer wall on an upper portion of the outer shell 14, approximately 2.75 inches from the top plate 16 is a three-piece 0.75 inch metal motor mount 34 constructed of three pieces of 0.75 inch metal. The motor mount 34 includes a top mounting plate 36 and two side supporting plates 38. The top mounting plate 36 is approximately 0.75 inch thick, approximately 12 inches long, and approximately 12 inches wide. The side supporting plates 38 are each approximately 0.75 inch thick, 4 inches wide, and 12 inches long. The side supporting plates 38 are vertically oriented and welded permanently onto the outer wall of the top section of the outer shell 14 for allowing the top mounting plate 36 to be welded onto the side supporting plates 38, thus permanently fixing the motor mount 34 to the housing 12.

The apparatus 10 includes a motor 40 mounted onto the motor mount 34 and having a duplex V-belt pulley having an outside diameter of approximately 26 inches for driving the drive shaft 26 at high speed. A suitable motor for use on the apparatus 10 is a conventional 20 HP 3450 RPM motor having an electronic soft starting drive circuit.

The housing 12 includes a base 44 that has three legs 46 that are geometrically centered at the bottom section of the outer shell 14. The legs 46 are made of metal tubing, approximately 2 inches square by 16 inches long, and having wall thickness of approximately 0.25 inch. The legs 46 are welded in an inverted L-shaped configuration, extending approximately 4 inches horizontally outwardly from the outer shell 14 and 6 inches downwardly. The bottom extremity of each of the legs 14 has a horizontally disposed plate 48 welded thereto for anchoring the housing 12. The plates 48 are formed of metal and are approximately 4 inches square by 0.25 inch thick, having 0.63 inch holes 50 formed therein for receiving a suitable anchor fastener (not shown).

A fitting 52, having an inside diameter of approximately 3 inches, is permanently welded to an upper portion of the outer shell 14, approximately 2.5 inches below the top plate 16, for forming an inlet 54 of the housing 12. Similarly, a fitting 56, having an inside diameter of approximately 3 inches, is permanently welded to a lower portion of the outer shell 14, approximately 4.5 inches above the bottom plate 18, for forming a discharge 58 of the housing 12. A supply line 60, having an inside diameter of approximately 3 inches, is fluid connected to the inlet 54 for bringing liquid product from filtering units 61 that are optionally included with the apparatus 10 such as when the waste water is expected to contain large quantities of undissolved solids or large solid pieces of contamination. Attached to the discharge 58 is a discharge line 62, having an inside diameter of approximately 3 inches, which discharges the treated water for reuse, for feeding rivers or streams, or for further processing.

Figure 3:
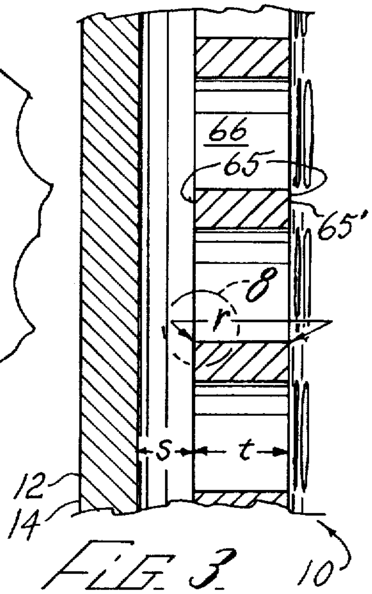
FIG. 3 is a sectional elevational detail view of the apparatus of FIG. 1 on line 3—3 of FIG. 2.

According to the present invention, the apparatus 10 includes a cylindrically tubular drum 64 that is rigidly coupled to the drive shaft 36 for rotation therewith as described below, the drum 64 having an outer or first blade surface 65. A multiplicity of second blade surfaces 66 are formed by corresponding radial passages 68 that extend through the drum 64, the passages 68 having a diameter d, being located at a circumferential spacing or pitch p and an elevational spacing or pitch h as shown in FIG. 4. As shown in FIG. 3, the drum 64 has a wall thickness t, the first blade surface 65 being spaced a distance s from an inside surface 65' of the outer shell 14, the inside surface 65' forming further counterparts of the first blade surface 65. In the exemplary configuration of the apparatus 10 described herein, the wall thickness t is approximately 0.63 inch, the drum 64 being roll-formed to approximately 10 inches in diameter, with approximately 980 of the passages 68 formed therein, the diameter d being approximately 0.75 inch, the passages 68, the pitch p and the pitch h being approximately 1.0 inch. Suitable materials for the drum 64 are carbon steel, stainless steel or other high strength corrosion resistant material. According to the present invention, separation of contamination from the water entering the inlet 54 is effected at the molecular level by collisions between the waste water and the drum 64, especially along intersections of the first blade surface 65 (including the inside surface 65') and the second blade surfaces 66 of the drum 64, the first blade surface 65 functioning as respective first blade surface portions associated with corresponding ones of the second blade surfaces 66. For efficient operation of the apparatus 10 it is important that the blade surfaces 65 and 66 intersect sharply. Accordingly, a blade intersection radius r is indicated in FIG. 3 at intersections of the second blade surfaces 66 with the first blade surfaces, the radius r being preferably very small, on the order of 0.001 inch. The passages 68 are appropriately formed by drilling through the material of the drum 64, with careful removal of burrs, if any, without excessive rounding at the first blade surface 65. The apparatus 10 is believed to operate effectively with the radius r not greater than 0.005 inch, 0.002 inch or even smaller being preferred. In a most preferred configuration, the radius r ranges from approximately 0.0003 inch to approximately 0.002 inch.

The drum 64 is connected to the drive shaft 26 by a vertically spaced pair of alignment plates 70, each of the plates 70 being approximately 0.50 inch thick and 10 inches in diameter, having outwardly extending arms 72 and a center opening 74 for receiving the drive shaft 26. The alignment plates 70 are welded permanently to upper and lower extremities of the drum 64 and to the drive shaft 26. The drive shaft 26 is approximately 2 inches in diameter, 60 inches long, and formed of carbon steel, stainless steel or other corrosion resistant metal. The drive shaft 26 has a dual belt pulley 76, having an outside diameter of approximately 3 inches, affixed thereto for drive by the motor 40 through a pair of belts 78, the drum 64 to rotating at approximately 30,000 RPM with the outer shell 14 remaining stationary. The combination of the drum 64 and the drive shaft 26 is carefully balanced for limiting vibration and dynamic loading of the bearings 28, the balancing being accurately maintained by the bearings 28 being precisely formed as indicated above.

Figure 5:
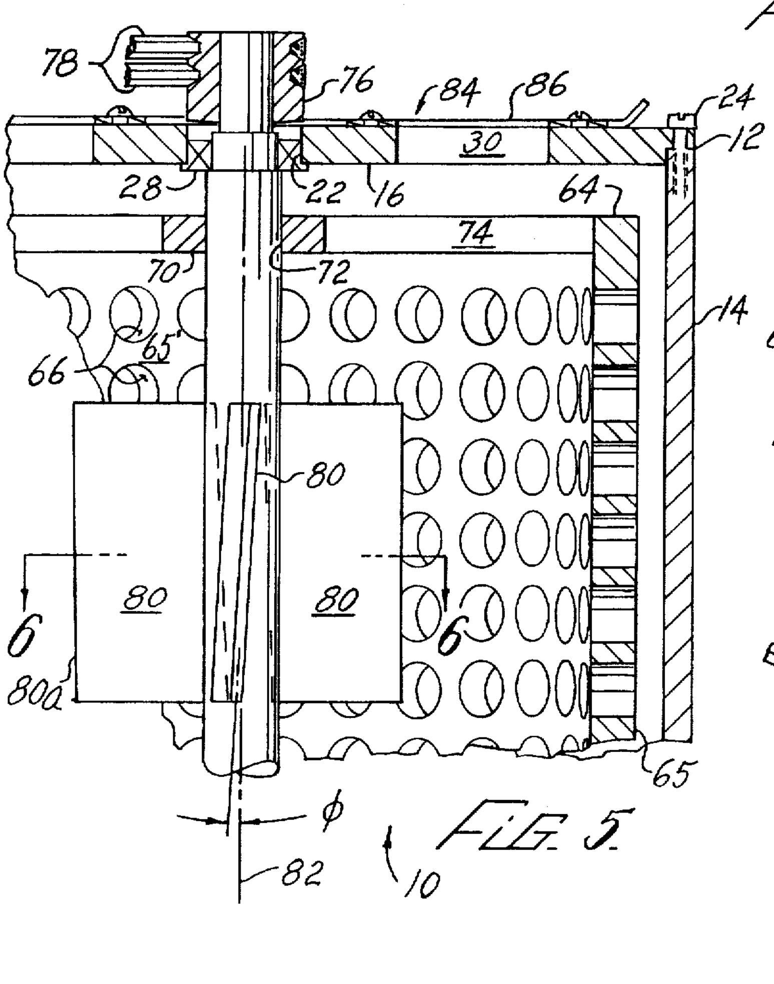
FIG. 5 is a fragmentary sectional elevational view of an upper portion of the apparatus of FIG. 1.
Figure 7:
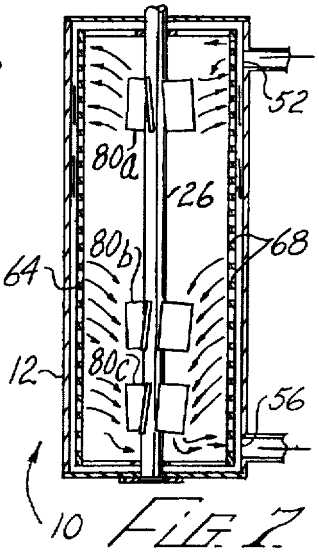
FIG. 7 is a sectional elevational detail view as in FIG. 3, showing an alternative configuration of the apparatus portion of FIG. 1.
Figure 6:
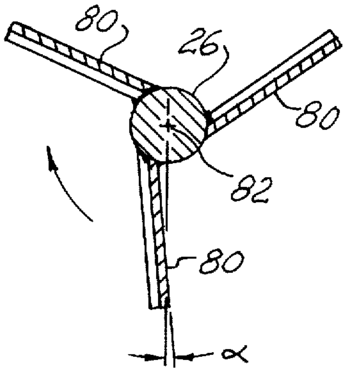
FIG. 6 is a sectional plan detail view of the apparatus portion of FIG. 5 on line 6—6 therein.

Inside the drum 64 there are rows of baffle blades 80, an exemplary configuration of the blades 80 being formed of 4 inch by 8 inch steel plate, approximately 0.25 inch thick for producing radial and axial flow components to induce desired turbulence and a partial vacuum within the housing 12. The baffle blades 80 are welded permanently to the drive shaft 26 at axially inclined angles in three rows of three each, one of the rows being located within an upper portion of the drum 64 as indicated at 80*a* in FIGS. 1, 2, and 5, the blades 80 thereof being slightly inclined at an angle $\phi$ from a shaft axis 82 of the drive shaft 26 for producing a upwardly directed flow within the drum 64 as shown by curved arrows in FIG. 7. In FIG. 5, the angle $\phi$ is approximately 3°. The angle $\phi$ can range from approximately 3° to approximately 15°, from 5° to 10° being most preferred. The other rows, designated 80*b* and 80*c*, are spaced apart within a lower portion of the housing 12, being oppositely inclined at the angle $\phi$ for producing a downwardly directed flow within the drum 64 as shown in FIG. 7. As further shown in FIG. 6, the inner edges of the baffle blades 80 are offset circumferentially ahead of the outer edges thereof, the blades 80 being inclined at an angle $\alpha$ from radial alignment with the shaft axis 82 for enhancing an outward flow component within the drum 64 in the vicinity of the baffle blades 80, the outward flow components being also shown in FIG. 7. In the exemplary configuration of the apparatus 10, the angle $\alpha$ can be from approximately 5° as shown in FIG. 6 to approximately 20°, 15° being preferred.

Thus the baffle blades 80 are effective for producing a recirculating flow through the passages 68 into and out of the drum 64 for repeatably subjecting incremental volumes of the waste water or other liquid being processed to repeated contacts with the blade surfaces 65 and 66.

A vent valve 84 is provided for the vent openings 30, in the form of a star-shaped valve plate 86 that is rotatably supported on the top plate 16 for variably blocking the openings 30. In the exemplary configuration of the apparatus 10 described herein, the valve 84 provides a total vent area that is adjustable from approximately 5.5 inches$^2$ to approximately 11 inches$^2$ for maintaining a desired partial vacuum within the housing 12 during operation of the apparatus 10.

An experimental prototype of the apparatus 10, configured as shown and described above in connection with FIGS. 1–6 but not having the row 80*b* of the baffle blades 80, has been built and tested as described herein. Contaminated waste water was fed into the inlet 54 of the apparatus 10 at a rate of approximately 180 gallons per minute under a head of 3–5 pounds per square inch from a preholding tank, an internal pressure within the housing being maintained at a partial vacuum of from 15 to 18 inches of water with the vent valve 84 fully open. The relative concentrations of various inorganic contaminants of the incoming waste water and treated water flowing from the discharge 58 were analyzed, the results being presented in Table 1 together with corresponding contamination limits as defined by the California State Health Department. In Table 1, the notation "ND" represents "none detected" the associated quantity being the measurement threshold for the corresponding contaminant. Also presented in Table 1 are measurements of biochemical oxygen demand using method SM 507, chemical oxygen demand using method EPA 410.4, and pH using method EPA 150.1.

TABLE 1

| | LIMITS | | RESULTS | |
|---|---|---|---|---|
| | | | Before | After |
| CAM INORGANICS | TTLC (mg/kg) | STLC (mg/l) | TTLC (mg/l) | TTLC (mg/l) |
| Antimony | 500 | 15 | ND < 0.03 | ND < 0.03 |
| Arsenic | 500 | 5.0 | ND < 0.002 | 0.006 |
| Barium | 10,000 | 100 | 0.03 | ND < 0.005 |
| Beryllium | 75 | 0.75 | ND < 0.002 | ND < 0.002 |
| Cadmium | 100 | 1.0 | ND < 0.002 | ND < 0.002 |
| Chromium, Hex. | 500 | 5 | ND < 0.07 | ND < 0.01 |
| Chromium, Total | 2,500 | 560 | ND < 0.005 | 0.04 |
| Cobalt | 8,000 | 80 | ND < 0.01 | ND < 0.01 |
| Copper | 2,500 | 25 | 0.03 | 0.48 |
| Fluoride | 18,000 | 180 | 0.49 | 0.69 |
| Lead | 1,000 | 5.0 | 0.004 | 0.12 |
| Mercury | 20 | 0.2 | ND < 0.0004 | ND < 0.0004 |
| Molybdenum | 3,500 | 250 | ND < 0.01 | 0.05 |
| Nickel | 2,000 | 20 | ND < 0.02 | 1.01 |
| Selenium | 100 | 1.0 | ND < 0.002 | ND < 0.002 |
| Silver | 500 | 5 | ND < 0.004 | ND < 0.004 |

TABLE 1-continued

| | | | | |
|---|---|---|---|---|
| Thallium | 700 | 7.0 | ND < 0.01 | ND < 0.01 |
| Vanadium | 2,400 | 24 | ND < 0.005 | 0.01 |
| Zinc | 5,000 | 250 | 0.1 | 2.6 |
| OXYGEN DEMAND | | | RESULTS Before | RESULTS After |
| Biochemical | | | 280 mg/l | 120 mg/l |
| Chemical | | | 440 mg/l | 410 mg/l |
| pH | | | 6.38 | 7.53 |

Another test was done with the waste water having hydrocarbon contamination, the results of which are shown in Table 2 below.

TABLE 2

| Total Hydrocarbons EPA 8015-Mod. | Machine/Before @ 3:05 pm | Machine/After @ 3:20 pm |
|---|---|---|
| Gasoline | 38 mg/l | ND <0.05 mg/l |
| Benzene (602) | 3.4 mg/l | ND <0.0003 mg/l |
| Toluene | 10.5 mg/l | ND <0.0003 mg/l |
| Ethylbenzene | 1.3 mg/l | ND <0.0003 mg/l |
| Total Xylenes | 5.8 mg/l | ND <0.0006 mg/l |

A further test was conducted on the experimental prototype of the apparatus 10, the results being presented in Table 3 together with corresponding California State Health Department Maximum Contamination Limits for drinking water.

TABLE 3

| | LIMITS | | RESULTS | |
|---|---|---|---|---|
| | | | Before | After |
| CONSTITUENT | MCL (mg/kg) | AL (mg/l) | MCL (mg/l) | AL (mg/l) |
| Calcium | | | 43 | 42 |
| Magnesium | | | 4.86 | 18 |
| Sulfate | 250-500-600* | | 18 | 27 |
| Cadmium | 0.010 | | 0.01 | ND <0.004 |
| Chromium | 0.05 | | 0.84 | 0.067 |
| Cobalt | | | ND <0.02 | ND <0.02 |
| Lead | 0.05 | | 0.005 | 0.010 |
| Nickel | | | 1.84 | 0.86 |
| Copper | 1.0 | | 0.15 | 0.059 |
| Total dissolved Solids | 500-1000-1500* | | 206 | 33 |
| Oil & Grease | | | ND <1 | ND <1 |
| Electrical Conductivity (μmho/cm) | | | 278 | 50 |
| OXYGEN DEMAND | | | RESULTS Before | RESULTS After |
| Biochemical | | | ND<1 | 60 |
| pH | | | 7.52 | 7.61 |

*Recommended-Upper-Short Term

The experimental prototype of the apparatus 10 was also tested for removing nitrate from water having a concentration thereof precluding authorized use as drinking water. A sample having 87 mg/L (ppm) was refined in the apparatus 10, yielding 17 mg/L (ppm) after processing. The nitrate concentration was successfully reduced to significantly less than the maximum allowable of 0.50 mg/L (ppm).

The size of the outer shell 14 and drum 64 can range from approximately 6 to 60 inches in diameter, 16 to approximately 72 inches in length according to the amount of water discharged from the user source, the speed of the drum 64 being preferably maintained at not less than approximately 1000 feet per second and preferably approximately 1500 feet per second. The drive shaft 26 can similarly range in sizes proportionately to the diameter and length of the drum 64. The inlet 54 and discharge 58 would also vary in size depending on the required flow rate capacity of the apparatus 10. Motor power requirements will also vary approximately in proportion to the number and size of the second blade surfaces 66, which is roughly proportional to the outside area of the drum 64. Where the waste water is likely to be contaminated with large solids or high concentrations of smaller solids the apparatus 10 preferably includes the conventional in line filter unit 61 upstream of the inlet 54 for filtering out large solids before the waste water encounters the drum 64, thus preventing large amounts of solids from being trapped in the bottom of the housing 12.

The manner in which the apparatus 10 of the present invention operates is believed to represent a substantial departure from prior waste water treatment methods in that the high speed rotation of the drum 64 at rates in excess of 1000 feet per second, in combination with repeated contact between the liquid and the sharp intersections between the first and second blade surfaces 65 and 66, effects separation of contaminants at the molecular level. The water passes through the passages 68 in the drum 64 with such force that it causes the water to separate heavy matter from lighter matter by means of gravity and hydraulic force. The heavy solids, having been thus freed, settle at the bottom of the housing 12, being also forced downward in currents generated by the baffle blades 80 and by incoming air through the vent openings 30. The separation at the molecular level advantageously destroys bacteria and other micro-organic contaminants. Further, the large quantities of air (approximately 750 cubic feet per second) admitted through the vent openings 30 of the apparatus 10 and infused with the waste water eliminates oxygen demand (BODs). Moreover, the apparatus 10 of the present invention produces pH neutralization of acidic and alkalinic waste water.

The solids are removed from the bottom of the separator by means of back flushing. Back flushing is running neutralized water back through the housing 12, thus allowing the apparatus 10 to be cleaned automatically. The in line filtering unit 61 may be cleaned in any suitable manner, such as by back flushing, replacement of filter media, if present, and by using a conveyer mechanism to remove settled solids.

Thus the present invention is effective for refining liquids, including neutralizing industrial, agricultural and municipal waste water, providing a valuable resource for preserving land and water resources by eliminating pollution and contamination resulting from other less effective treatments. The apparatus 10 is also effective for balancing pH in swimming pools and removing nitrates from drinking water. The apparatus 10 is versatile and compact, being suitable for on-site recycling of neutralized water, capable of high flow rates for avoiding a need for holding tanks. The apparatus 10 is simple in construction, requiring little maintenance and no consumable supplies.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. Apparatus for refining a liquid, comprising:

(a) a vertically oriented housing having an inlet for receiving the liquid and an outlet for delivery of refined liquid, the inlet being located above the outlet;

(b) a vertically extending cylindrical drum member rotatably mounted in the housing, the drum member having a radial thickness t between inside and outside surfaces thereof, a multiplicity of radial passages being formed in the drum member, at least a portion of each passage terminating with the outside surface at a corner radius r of not more than approximately 0.002 inch;

(c) a drive for rotating the drum to a peripheral speed of at least 1000 feet per second; and (d) a plurality of baffle blades supported within the drum member for rotation therewith, an upper set of the baffle blades being oriented for producing a radial flow having a vertical component, and a lower set of the baffle blades being oriented for producing a radial flow having a vertical component directed oppositely of the vertical component of the upper set, whereby molecules of the liquid are physically separated from the contaminants for forming the refined liquid, the refined liquid flowing from the outlet.

2. The apparatus of claim 1, wherein each of the passages is approximately circularly cylindrical, having a passage diameter d.

3. The apparatus of claim 2, wherein the passage diameter d is from approximately 0.25 inch to approximately 2.0 inches.

4. The apparatus of claim 2, wherein the passage diameter d is from approximately 0.5 inch to approximately 1.0 inch.

5. The apparatus of claim 2, wherein the passage diameter d is approximately 0.75 inch.

6. The apparatus of claim 2, wherein the passage diameter d is from approximately 100% of the thickness t to approximately 150% of the thickness t.

7. The apparatus of claim 1, further comprising a vent for admitting air into the housing.

8. Apparatus for refining waste water, comprising:

(a) a housing having an inlet for receiving the waste water and an outlet for delivery of refined water;

(b) a cylindrical drum member rotatably mounted in the housing, the drum member having a radial thickness t between inside and outside surfaces thereof, a multiplicity of circularly cylindrical passages being formed in the drum member, the passages having a passage diameter d, the passage diameter d being approximately 0.75 inch, portions of each passage terminating with the inside and outside surfaces at respective corner radii r of not more than approximately 0.002 inch;

(c) a vent for admitting air into the housing;

(d) a drive for rotating the drum to a peripheral speed of at least 1000 feet per second; and (e) a plurality of baffle blades supported within the drum member for rotation therewith, a first set of the baffle blades being located near one end of the drum and oriented for producing an outward flow having a component directed toward an opposite end of the drum, and a second set of the baffle blades located near the opposite end of the drum and oriented for producing an outward flow having a component directed toward the one end of the drum, whereby molecules of the waste water are physically separated from the contaminants for forming the refined water, the refined water flowing from the outlet.

* * * * *